March 19, 1929.  S. R. FRAIM  1,706,151
LOCKING DEVICE
Filed Dec. 27, 1927  3 Sheets-Sheet 1
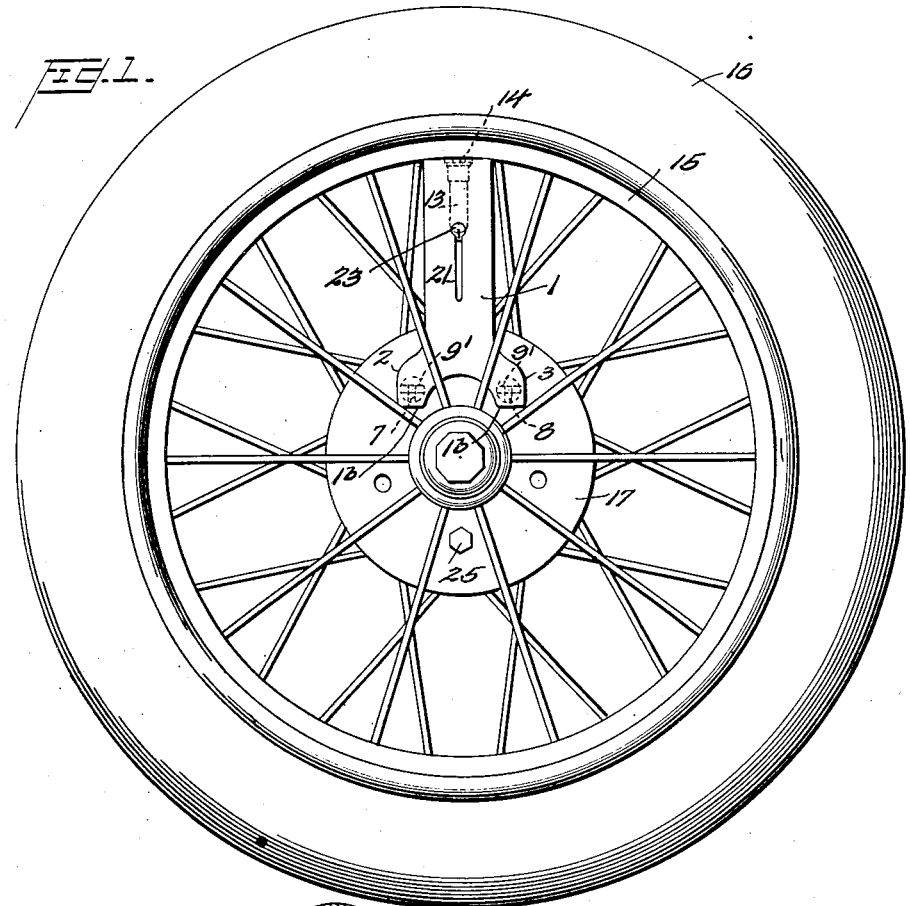
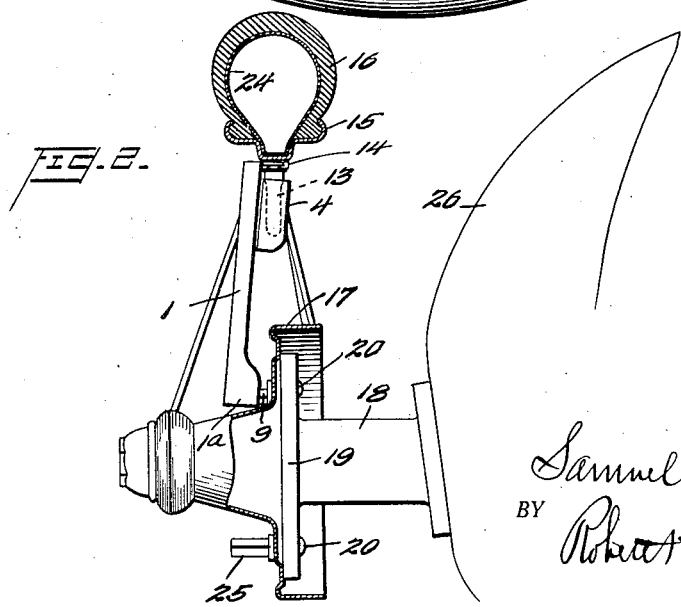
INVENTOR.
Samuel R. Fraim
BY Robert H. Young
ATTORNEY.

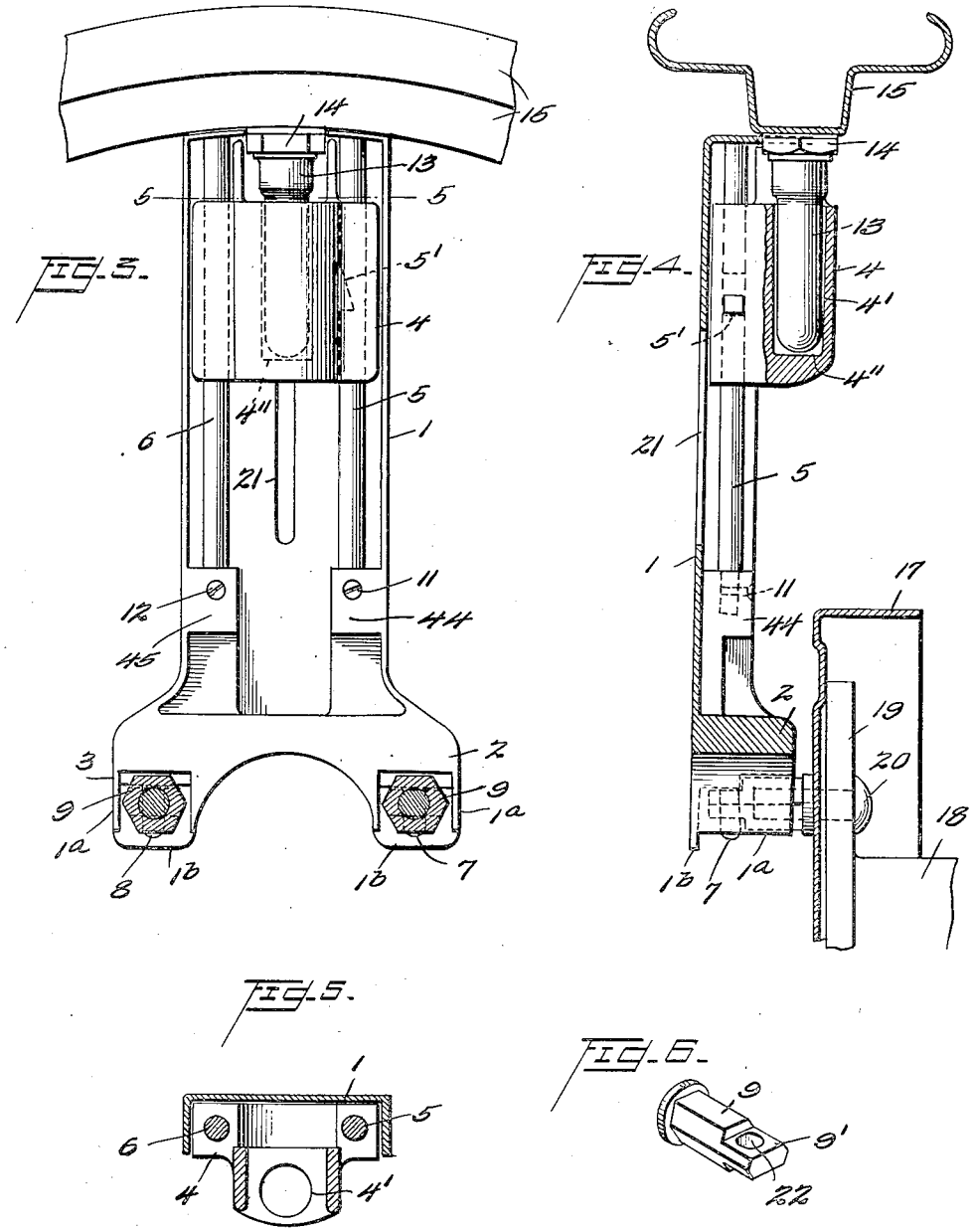

March 19, 1929.  S. R. FRAIM  1,706,151
LOCKING DEVICE
Filed Dec. 27, 1927   3 Sheets-Sheet 3
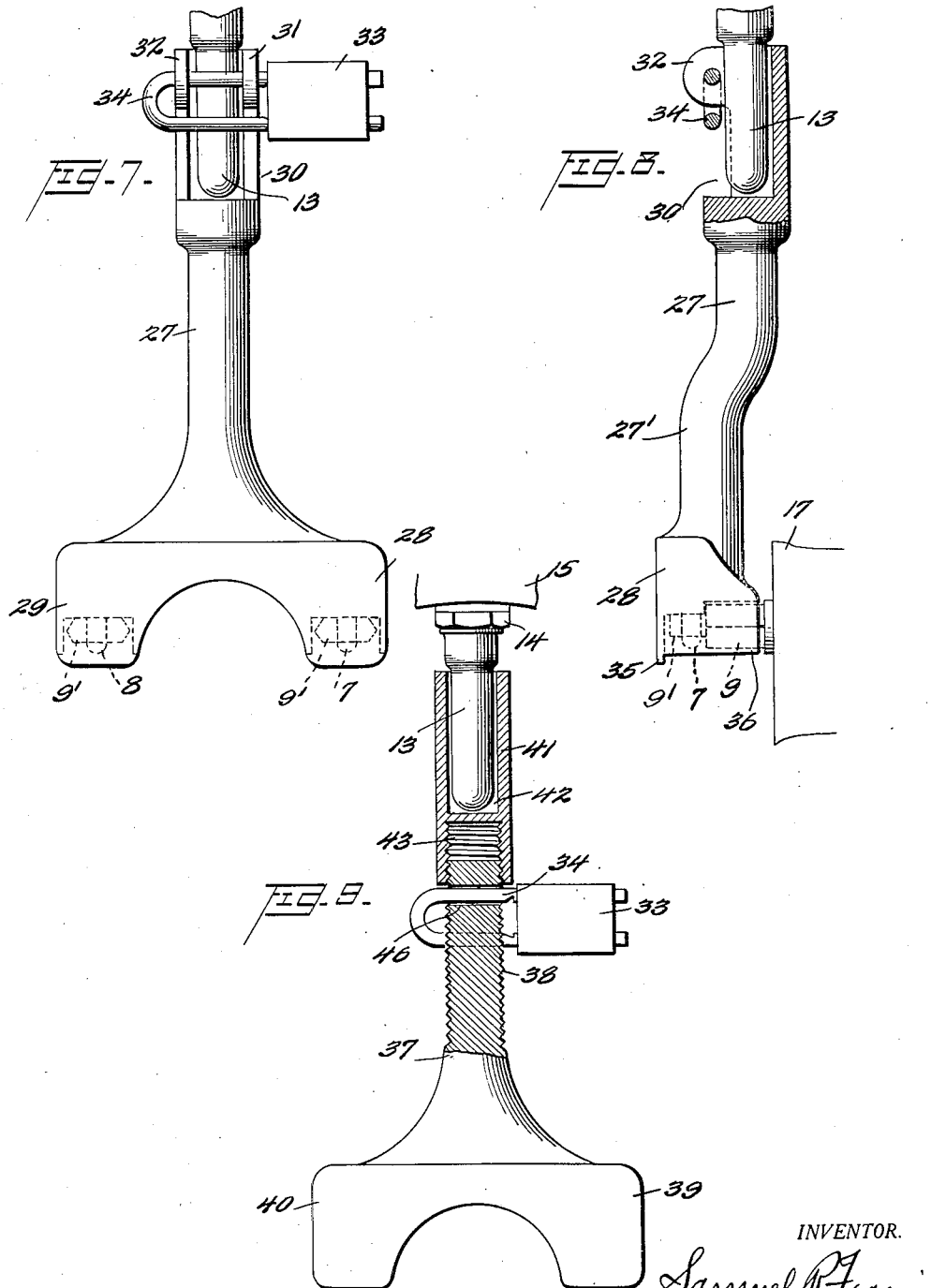
INVENTOR.
Samuel R Fraim
BY Robert H. Young
ATTORNEY.

Patented Mar. 19, 1929.

1,706,151

UNITED STATES PATENT OFFICE.

SAMUEL R. FRAIM, OF LANCASTER, PENNSYLVANIA.

LOCKING DEVICE.

Application filed December 27, 1927. Serial No. 242,736.

This invention relates in general to locking devices and more particularly to improvements in locking devices for retaining spare tires of automotive vehicles.

An object of this invention is to provide a combined locking device capable of locking an automobile spare tire on its rim and rim carrier, and also safeguarding against the removal of the rim carrier from the vehicle to which it is attached.

A further object is to provide a combined locking device which will be readily applied, easily operated by the proper key, and which will not only maintain the tire carrier and tire assembly locked to the body of the vehicle, but will also keep all of the parts of the assembly in locked relation to each other.

The proposed locking device is especially adapted for utility in connection with tires carried on wire wheels and even more particularly adapted for the Ford automobile wire wheels both now in common use and in production. Since 1926, the Ford spare tire carrier has included a rearwardly extending rod rigidly fastened to the chassis and terminating in a plate to which the remainder of the carrier assembly is detachably bolted. This rod construction and a certain type of tire locking device is disclosed in my patent relating to Locking device No. 1,633,172, issued June 21, 1927.

In order to more efficiently adapt the broad theory contained therein to the problem of retaining a spare wire wheel and tire, I propose to provide a locking assembly for, broadly speaking, locking the tire valve cap to the chassis of the vehicle. In detail the proposed device prevents an unauthorized removal of the valve outer dust cap, which in turn prevents the removal of the valve stem nut. This not only locks the inner tube but prevents deflation of the tire by operating the valve to render the tire casing removable from the rim. The device further provides for locking the wire wheel to the wheel carrier which is rigidly connected to the chassis.

With the foregoing and other objects in view, the invention consists in the combination of parts and in the details of construction, hereinafter described, certain embodiments being illustrated in the accompanying drawings, in which:

Fig. 1 is a view in elevation of the spare wire wheel and tire, with one form of my locking device applied in locked relation thereto, and showing the tire valve stem cap in dotted lines.

Fig. 2 is a view partially in vertical section and partly in side elevation of the tire and wheel and carrier assembly with the same form of locking device shown in Fig. 1 in locked relation.

Fig. 3 is a view in rear elevation and enlarged of the same form of locking device applied in locked relation to the valve stem dust cap.

Fig. 4 is a view in vertical section of the same form of locking device applied in locked relation to the dust cap, and a fragmentary sectional showing of the wheel drum.

Fig. 5 is a view in section taken along line 5—5 of Fig. 3, showing a top plan view of the lock casing with the two rods, on which the padlock slides, shown therein in section.

Fig. 6 is a detailed view in perspective of the nut for retaining the wheel to its carrier with a hole to receive a leg of the locking device.

Fig. 7 is a view in elevation of another form of my locking device applied to the valve stem cap, and a padlock attached to said device.

Fig. 8 is a view partly in side elevation and partly in section of the same as shown in Fig. 7 with a fragmentary showing of the wheel drum to which the device is attached by means of a nut, shown in dotted lines.

Fig. 9 is a view partly in elevation and mostly in vertical section of another modification of my invention applied to the valve stem cap, with a padlock attached to the device.

Referring more particularly to the drawings the form of my invention disclosed in Figs. 1 to 5 inclusive consists in a casing 1 of durable material in which are mounted two vertical rods 5 and 6 being attached by set screws 11 and 12 respectively to the abutment members 44 and 45 which are integral with the casing. The rods 5 and 6 are laterally spaced from the casing wall in order that the lock casing 4 may be slidably mounted thereon, with the abutment members 44 and 45 as the limit of downward movement. The lock casing 4 is provided with a vertical recess 4' closed at the lower extremity at 4' to receive the outer valve stem dust cap 13 throughout the major portion of its length.

In Fig. 2, there is shown diagrammatically a fragmentary portion 26 of the chassis to which is rigidly secured a carrier rod 18 terminating in a plate 19 as part of the standard equipment of the present Ford automobile. Three bolts 20 extend rearwardly through the plate 19, two adjacent ones at the top, and one at the bottom, to receive the wheel to be supported thereby. This is done by placing the wheel so that the apertures in the wheel drum 17 coincide with the bolts 20. It is customary to use two such retaining nuts as shown at 25 and one similar to that shown at 9 in Fig. 6 which nut is provided with a flat portion 9' with an aperture 22 to receive a locking device. I propose to use only one nut 25 at the bottom and two such nuts as shown at 9 at the top of the plate 19. All three nuts are screwed onto the bolts 20.

The casing 1 is further provided with a vertically downwardly extending stud 7 in the leg 2 and a similar stud 8 in leg 3 to engage the apertures 22 in the two upper nuts 9.

In applying the locking device assuming that the valve stem dust cap 13 is in place and that the two upper nuts 9 are in place, the sliding lock 4 is unlocked and forced down on the rods 5 and 6 to its lowermost position against the abutment members 44 and 45. The device is inserted between the spokes of the wheel and the two studs 7 and 8 forced through the apertures 22 of the nuts 9. The casing is then held in vertical position and the lock 4 is forced upwardly to its upper limit where the lock which may consist of any suitable inner locking mechanism engages a notch such as shown at 5' on the rod 5 in Fig. 4. Simultaneously with and due to the upward movement of the padlock, the valve stem cap 13 is received in the recess 4' throughout the major portion of the length of the cap 13. The casing 1 is provided with a slot 21 restricted in width in such a manner as to prevent the key from being removed until the key is moved to a position above the restricted portion of the slot. The key plug 23 in the lock 4 remains underneath the casing 1. The casing is of such length and dimensions that the upper end fits fairly snugly against the underneath of the tire rim 15. The lower end of the casing is considerably enlarged at 1ª to protect the nut 9, throughout the major portion of its length, against tampering with a prying tool. The casing is also extended at 1ᵇ on each leg lower than the studs 7 and 8 to prevent tampering.

It will be readily seen that with the device in locked position as shown and hereinabove described, the wheel is securely attached to the carrier plate 19 by means of the nuts 9, and further that the locking device effectively secures these nuts 9 against removal. It will also be seen that by the single locking operation of the lock the valve stem dust cap 13 is effectively protected against mutilation or removal. Further, with the dust cap 13 thus secured it is impossible to remove the valve nut 14 which, as usual, secures the inner tube 24 of the tire casing 16 to the tire rim 15, making it also impossible to deflate the inner tube by manipulating the tire valve. The tire casing 16 may not be removed from the rim 15 without the inner tube being in deflated condition. Thus a complete and effective locking means has been provided for the wheel, rim, and tire, which means is simple and cheap in construction and easily operated by the authorized individual.

It is essential that my invention not be limited to the specific construction hereinbefore described, and for that reason I am incorporating two modifications, as shown in Figs. 7 and 9 for accomplishing the same resulting locked engagement of the nuts 9 and the valve stem cap 13, by different detailed construction.

Referring to Fig. 7 there is shown a bracket having a post 27 and two legs 28 and 29 with studs 7 and 8 the same as described above. The post 27 is enlarged and cut away at 30 to receive the valve stem 13. Ears 31 and 32 integral with the upper portion of the post are perforated to receive any suitable locking member such as the shackle 34 of the padlock 33. The post 27 is shown bent outwardly at 27' to make for correct alignment between the valve stem cap 13 and the nut 9 in case they are vertically offset with relation to each other. As in the first form of my invention both legs 28 and 29 are extended at 36 and 35 to form added protection for the nuts 9 and studs 7 and 8 respectively against tampering with a prying tool.

A still further modification of my invention is shown in Fig. 9 in which form the post 37 is screw threaded at 38 with an aperture 46 bored through the screw-threaded portion near its upper end. A sleeve 42 is recessed at its upper end at 42 at such a depth as to receive the cap 13 throughout the major portion of its length, and interiorly screw threaded at its lower end at 43 to engage the screw-threaded portion 38 of the post 37. The legs 39 and 40 are provided with the same type of studs 7 and 8 as shown in the other forms for the same purpose, these not being shown in Fig. 9 for the sake of avoiding duplication of description. As the sleeve is screwed upwardly the valve stem cap 13 reaches the bottom of the recess 42 simultaneously as the recess 46 is clear of the sleeve 41 and directly beneath the lower end of this sleeve. The aperture 46 may receive any suitable locking means such as shown in the conventional shackle which is shown thrust therethrough and retained by the padlock 33.

I claim:

1. A device of the character described including a bracket having nut engaging means at its lower end, a pair of upstanding rods on said bracket, a lock slidably mounted on said rods, said slidably mounted lock being provided with a recess to receive a tire valve cap, and a casing for the device.

2. A device of the character described including a bracket having nut engaging means at its lower end, a pair of upstanding rods on said bracket, and a lock slidably mounted on said rods for effecting engagement therewith, said slidably mounted lock being provided with means to receive a tire valve cap.

In testimony whereof I affix my signature.

SAMUEL R. FRAIM.